US012574289B2

(12) United States Patent
Aijaz et al.

(10) Patent No.: US 12,574,289 B2
(45) Date of Patent: Mar. 10, 2026

(54) NETWORK SLICING IN OPEN RAN SYSTEMS

(71) Applicant: Kabushiki Kaisha Toshiba, Tokyo (JP)

(72) Inventors: Adnan Aijaz, Bristol (GB); Sajida Gufran, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 52 days.

(21) Appl. No.: 18/359,491

(22) Filed: Jul. 26, 2023

(65) Prior Publication Data

US 2025/0039054 A1     Jan. 30, 2025

(51) Int. Cl.
*H04L 41/0893* (2022.01)
*H04L 41/40* (2022.01)
*H04W 24/02* (2009.01)

(52) U.S. Cl.
CPC .......... *H04L 41/0893* (2013.01); *H04L 41/40* (2022.05); *H04W 24/02* (2013.01)

(58) Field of Classification Search
CPC ....... H04B 7/26; H04L 41/0893; H04L 41/40; H04L 12/24; H04Q 7/38; H04W 24/02; H04W 28/02; G06F 9/50
USPC ....................................................... 370/328
See application file for complete search history.

(56) References Cited

U.S. PATENT DOCUMENTS

| | | | |
|---|---|---|---|
| 11,601,819 B2 | 3/2023 | Chou et al. | |
| 2018/0317134 A1* | 11/2018 | Leroux | H04L 41/0806 |
| 2020/0329381 A1* | 10/2020 | Chou | H04W 24/02 |
| 2021/0127437 A1 | 4/2021 | Aijaz | |
| 2023/0336287 A1* | 10/2023 | Mehta | G06F 11/14 |

OTHER PUBLICATIONS

Aijaz, "Private 5G: The Future of Industrial Wireless" IEEE Industrial Electronics Magazine, vol. 14, No. 4, 2020, 10 pages.

* cited by examiner

*Primary Examiner* — Ricky Q Ngo
*Assistant Examiner* — Meheret Woldegebreal Kidane
(74) *Attorney, Agent, or Firm* — Oblon, McClelland, Maier & Neustadt, L.L.P.

(57) ABSTRACT

Embodiments provide a method for creating a slice in a communication network. The communication network comprises a radio access network, RAN, a core network, and a RAN Intelligent Controller, RIC, with a near-real-time RIC. The method comprises determining a network slice instance, NSI, the NSI comprising at least one network slice subnet instance, NSSI, in the RAN and at least one NSSI in the core network, communicating the at least one NSSI in the RAN to the near-RT-RIC and communicating the at least one NSSI in the core network to the core network.

11 Claims, 11 Drawing Sheets

NETWORK SLICING IN OPEN RAN SYSTEMS

FIELD OF THE INVENTION

The present invention relates to method and systems for managing and orchestrating network slicing in 5G Open RAN systems.

BACKGROUND

Open Radio Access Network (Open RAN) is a technology for radio-access segments of telecommunication cellular networks, such as 5G broadband cellular networks. Open RAN involves the disaggregation of radio access networks into parts which are interconnected by open, standards-based, interoperable interfaces, using open, standards-based protocols for communicating over those interfaces. Open RAN systems generally involve running software stacks on general-purpose vendor-neutral hardware and provide multi-vendor interoperability and pave the way toward resilient and diversified supply chains and markets.

Network slicing is a method of creating a plurality of logically separated virtual networks over a common physical infrastructure, such that each logical network is optimised for the requirements of a specific application, service or set of users. It is used to provide design flexibility in multi-service networks such as 5G networks enabling them to support different services and applications with different requirements.

An object of embodiments described herein is to provide improved methods and systems for orchestrating and managing network slicing in 5G Open RAN systems.

Arrangements of the embodiments will be understood and appreciated from the following detailed description, made by way of example and taken in conjunction with the drawings.

DETAILED DESCRIPTION

Figure 1:
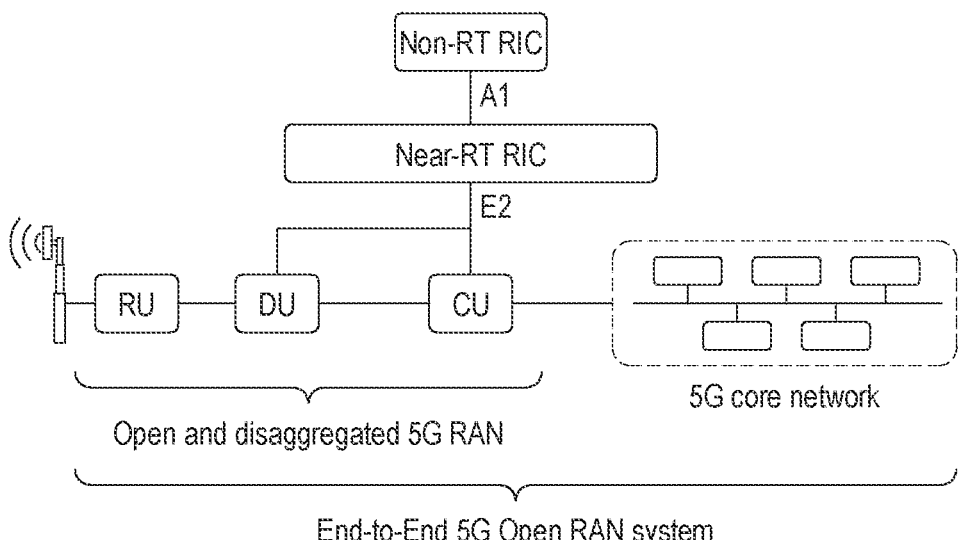
FIG. 1 shows a general example of a 5G open RAN network architecture.

According to an embodiment, there is provided a method for creating a slice in a communication network. The communication network comprises a radio access network, RAN, a core network, and a RAN Intelligent Controller, RIC, with a near-real-time RIC. The method comprises determining a network slice instance, NSI, the NSI comprising at least one network slice subnet instance, NSSI, in the RAN and at least one NSSIs in the core network, communicating the at least one NSSI in the RAN to the near-RT-RIC and communicating the at least one NSSI in the core network to the core network.

In an embodiment the NSI is determined based on at least one slice requirement.

In an embodiment the method comprises receiving customer requirements for the network slice and converting the customer requirements into the at least one slice requirement.

In an embodiment the NSI is determined by a 5G service platform comprising a non-real-time RIC.

In an embodiment the method further comprises the near-RT-RIC deploying of the at least one NSSI in the RAN and a slice instantiation function of the core network deploying the at least one NSSI in the core network.

In an embodiment determining the NSI comprises creating an NSI slice composition with basic connectivity functions which are distributed across the network, the connectivity functions comprising a transmission function, a connection function, a forwarding function, a mobility function, and a security function.

In an embodiment determining the NSI comprises performing optimization of the NSI by creating a redundant NSSI in the RAN.

In an embodiment the method further comprises the near-RT RIC deploying at least one control plane centralised unit, CU-CP, virtual network function, VNF, instance, deploying at least one user plane centralised unit, CU-UP, VNF instance, pairing each of the at least one CU-CP VNF instances with one or more of the at least one CU-UP VNF instances, mapping the CU-UP VNF instances and CU-CP VNF instances to core network functions, deploying at least one distributed unit, DU, VNF instance, pairing the at least one DU VNF instance with a radio unit, RU, physical network function, PNF.

In an embodiment the method further comprises the core network deploying at least one access and mobility management function, AMF, virtual network function, VNF, instance, selecting a session management function, SMF, deploying at least one SMF VNF instance, selecting a user plane function, UPF, deploying at least one UPF VNF instance and mapping the at least one UPF VNF instance to the at least one AMF VNF instance and to the at least one SMF VNF instance.

In an embodiment there is provided a method for a near-RT RIC to manage a network slice in a RAN, the method comprising the near-RT RIC receiving periodic reports from a plurality of virtual network function instances in the RAN, the reports including a plurality of parameters of the instance, comparing at least one of the received parameters to at least one criteria; and if the at least one received parameter meets the at least one criteria, and modifying or deleting that instance.

In an embodiment there are provided one or more non-transitory storage media comprising computer instructions executable by a processor, the computer instructions when executed by the processor causing the processor to perform a method as described above.

Referring to the figures generally, there are shown embodiments of methods and systems for creating and managing network slices in Open RAN telecommunication networks, such as Open RAN 5G telecommunication networks.

Telecommunication networks generally comprise a radio access network (RAN), which implements a radio access technology and communicates with user equipment (UE), and a core network (CN) which provides and controls services for user equipment connected to the RAN. The RAN consists of at least one radio unit (RU), at least one distributed units (DU) and at least one centralised units (CU), combinations of which may together define one or more base stations and/or baseband units (BBUs). The core network may comprise a plurality of elements connected by a wired interface.

An RU may convert radio signals to and from digital signals, may provide the digital front end and parts of the physical layer of the protocol stack and/or may provide digital beamforming. The DU may provide the RLC layer, MAC layer, and parts of the PHY layer, and may be provided at or near to one or more associated RUs. The CU may provide the RRC and PDCP layers and may support multiple DUs, and may be located at a distance from the RUs and DUs. The individual components of the RAN may be deployed on dedicated physical resources, such that they define physical network functions (PNFs) or as instances on virtualized resources, such that they define virtualized network functions (VNFs).

Open RAN systems comprise a software-defined RAN Intelligent Controller (RIC) with which embodiments as described herein may create and manage network slices. The RIC is divided into a non-real-time RIC (Non-RT RIC), which may manage events and resources with a response to time of 1 second or more, and a near-real-time RIC (Near-RT RIC), which may manage events and resources requiring faster response times. The near-RT RIC may be deployed centrally or at the networks edge.

FIG. 1 shows a general example of a 5G open RAN network architecture, comprising of a 5G core network, an RIC, and a RAN comprising an RU, a DU and a CU. The RIC comprises a non-RT RIC and a near-RT RIC. The Non-RT RIC communicates with the near RT RIC via an A1 interface and the near-RT RIC communications with the DU and the CU of the RAN via an E2 interface.

Figure 2:
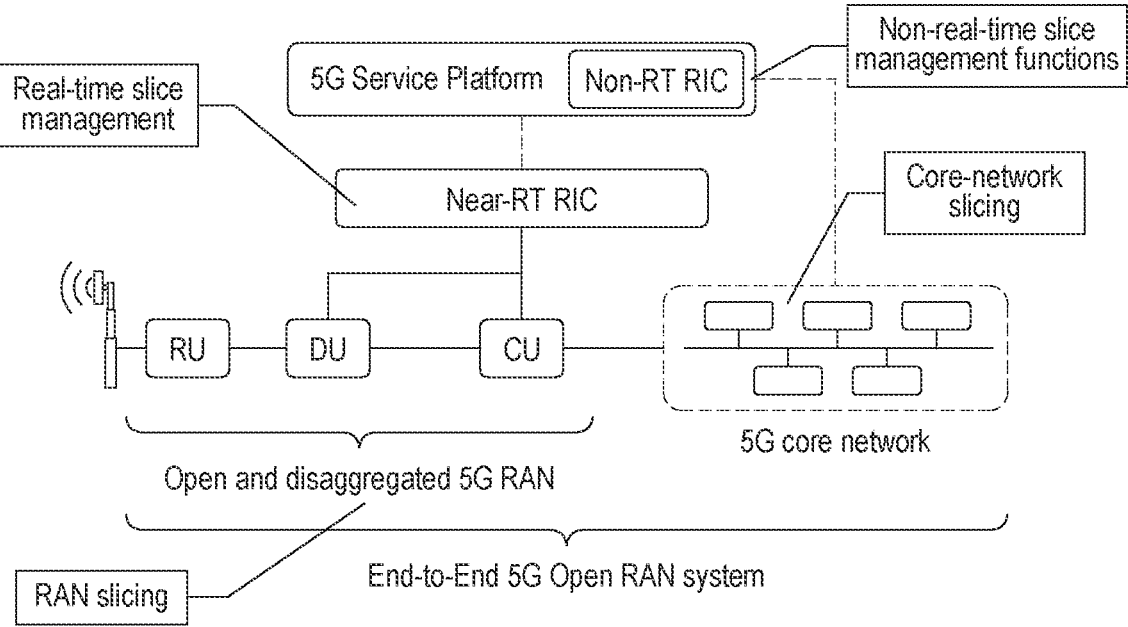
FIG. 2 shows an embodiment of a 5G open RAN network architecture configured to create network slices.

FIG. 2 shows an example of a 5G open RAN network architecture as shown in FIG. 1 further configured to implement an embodiment of a method for creating network slices. In the illustrated example, the method is implemented by a 5G service platform comprised by the system, which includes the non-RT RIC.

The service platform is configured to determine a network slice instance (NSI) consisting of at least one network slice subnet instance (NSSI) in the RAN and at least one NSSIs in the core network. The service platform communicates the at least one NSSI in the RAN to the near-RT-RIC and communicates the at least one NSSI in the core network to the core network. The at least one NSSI in the RAN may then be implemented by the near-RT RIC and the at least one NSSI in the core network may then be implemented by an element thereof, such as a slice instantiation function thereof.

The NSI may be determined by a network slice management function (NSMF) which may be comprised by the 5G service platform. The NSI may be determined based on one or more slice requirements, such as slice requirements specified in a slice profile. Such slice requirements may include: a slice type (in terms of the 3GPP-defined categories of eMBB, uRLLC, or mMTC), an end-to-end latency for the slice, an average downlink (DL) and/or uplink (UL) throughput, a jitter (end-to-end latency variation), a reliability (for example, in terms of a packet delivery ratio), a number of required connections, an associated 5G 1uality-of-serviceo profile (such as in terms of 5G QoS indicator (501) value), a resource type, and/or other slice requirements.

The slice requirements and/or slice profile may be determined based on customer requirements, such as requirements from a network operator, which may be received by the system, for example, through a slice template or a user interface. The customer requirements may be converted into slice requirements and/or a slice profile by a customer slice requirement function (CSRF). Such customer requirements may include: a type of service (such as, real-time, control, video, or internet-of-things, etc.), an expected data rate and/r latency, a number of users, an expected availability, and/or other customer requirements. Alternatively, the slice requirements themselves may be received by the 5G service platform.

Figure 3:
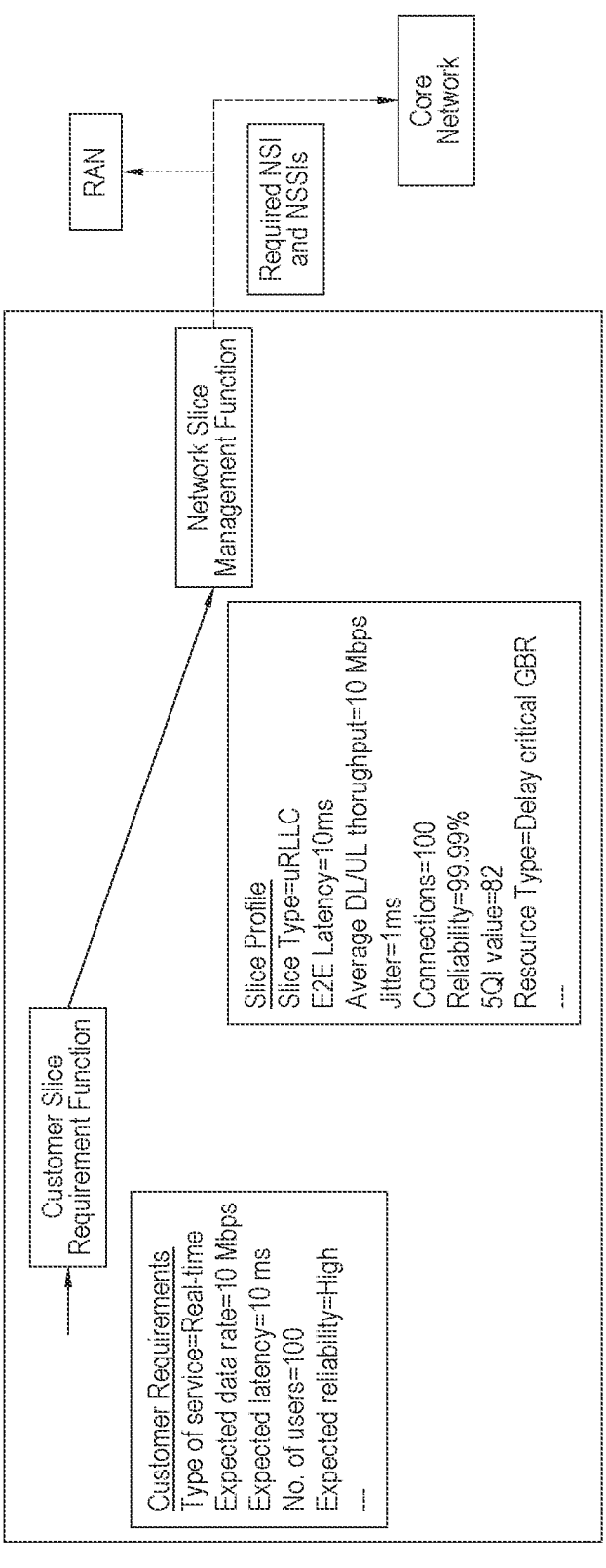
FIG. 3 shows slice management functions of a network architecture configured to create network slices.

FIG. 3 shows an example of an embodiment in which a CSRF receives customer requirements for an industrial automation use-case and converts them into a slice profile specifying slice requirements. A NSMF determines the NSI and the NSSIs and they are then communicated to the RAN and the core network.

The CSRF and NSMF may be non-real time network functions which may be provided on the same platform as the non-RT RIC, for example on a 5G service platform, as shown in FIG. 2. In such embodiments, the slice management functions may communicate via internal APIs which may be specific to the platform.

Figure 4:
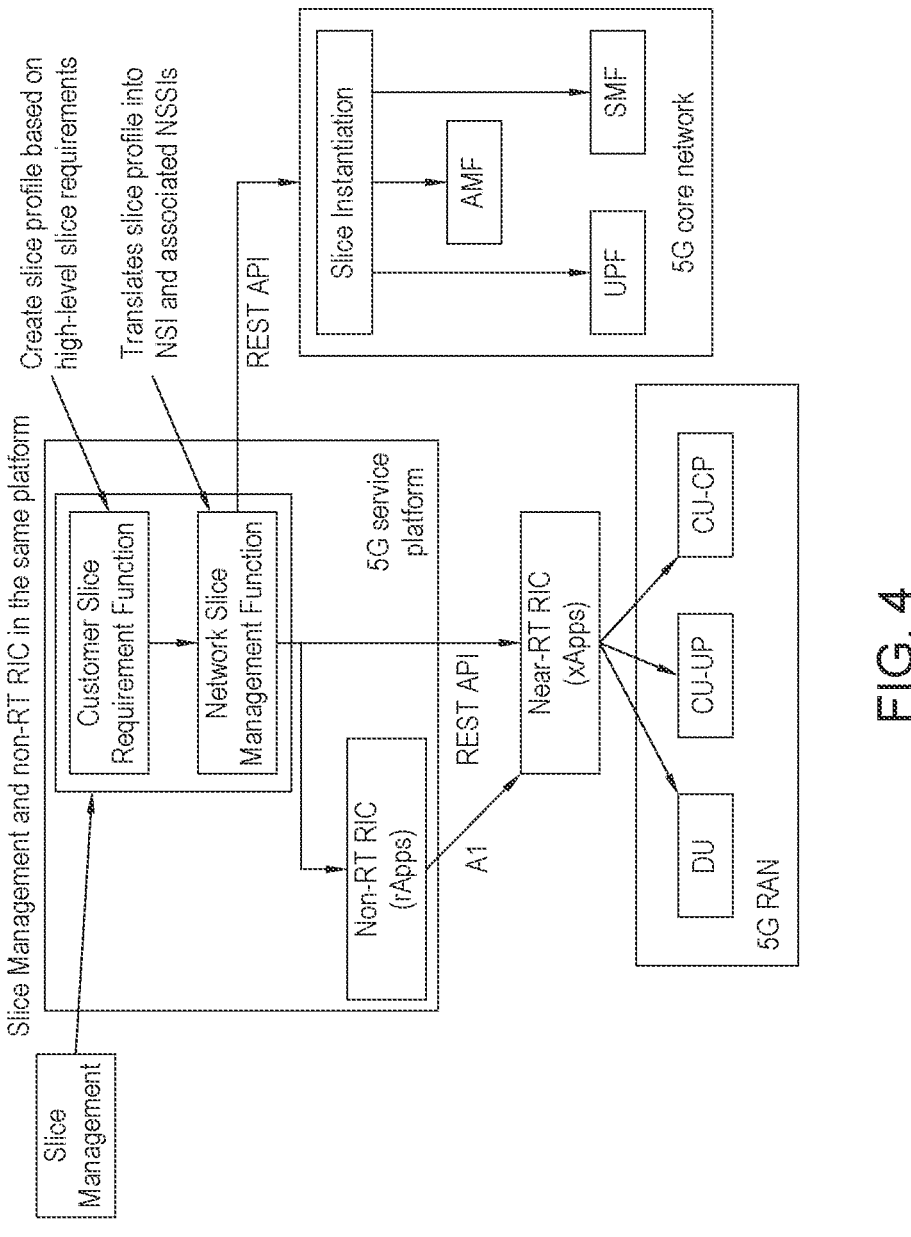
FIG. 4 shows an embodiment of 5G open RAN system in which slice management functions are provided on 5G service platform.

FIG. 4 shows an example of an embodiment of 5G open RAN system in which the slice management functions (the CSRF and the NSMF) are provided on 5G service platform along with the non-RT RIC, illustrating the interaction of the slice management function with the remainder of the network elements. In the illustrated system, the CSRF creates a slice profile based on high-level slice requirements, such as customer-provided requirements. The NSMF translates the slice profile in an NSI comprising NSSIs for both the 5G RAN and the 5G core network.

After the NSI is determined, the 5G slice management functions provide the at least one NSSI for the RAN to the near-RT RIC that controls real-time elements of the RAN. In the example shown in FIG. 4, and in other embodiments, the at least one determined NSSI for the RAN may be transmitted to the near-RT RIC via the A1 interface that connects the non-RT RIC and the near-RT RIC, or via one or more REST APIs. After the near-RT RIC receives the at least one determined NSSI, the near-RT RIC triggers the deployment of the at least one NSSI in elements of the RAN (for example, in one or more distributed units (DUs), one or more centralised units user planes (CU-UPs), and/or one or more centralised units control planes (CU-CPs)). The at least one NSSI may be deployed using xApps software.

Additionally, after the NSI is determined, the 5G slice management functions provide the at least one NSSI for the core network thereto, for example via one or more Rest APIs, as shown in FIG. 4. A slice instantiation function running in the core network may then deploy the at least one NSSI with the necessary network functions. The at least one NSSI in the core network may comprise an access and mobility management function (AMF), session management function (SMF) and/or user-plane function (UPF).

In other embodiments, these slice management functions may be provided via cloud computing means. For example, the CSRF and/or the NSMF may be third-party functions available from a marketplace. In such embodiments, the near-RT RIC and the core network may access these functions via a subscription to an API gateway.

Figure 5:
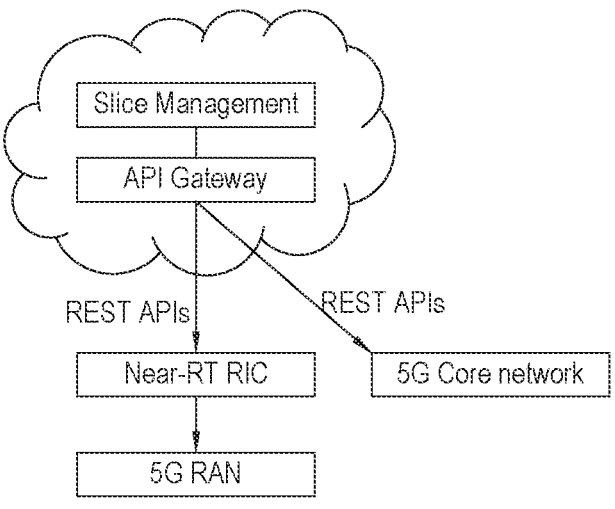
FIG. 5 shows an embodiment of 5G open RAN system in which slice management functions are provided as cloud computing functions.

FIG. 5 shows an example of an embodiment in which the CSRF and NSMF slice management functions are provided as third-party cloud computing functions, and in which the slice management functions provide the NSSIs for RAN and for the Core network to the near-RT-RIC and the core network via Rest APIs.

In some embodiments, the slice management functions may reside at the near-RT RIC and may communicate via its internal messaging structure (such as a data bus).

The NSI determined by embodiments described herein comprises at least one NSSI in the RAN and at least one NSSI in the core network, which together may define an end-to-end NSI. Each NSSI can be uniquely identified by network-specific values. The NSSI in the RAN may comprise one or more radio units (RUs), one or more distributed units (DUs), one or more centralised units user planes (CU-UPs), and/or one or more centralised units control planes (CU-CPs). The NSSI in the core network may an access and mobility management function (AMF), session management function (SMF) and/or user-plane function (UPF). The determined NSI may be a determined NSI slice composition.

Figure 6:
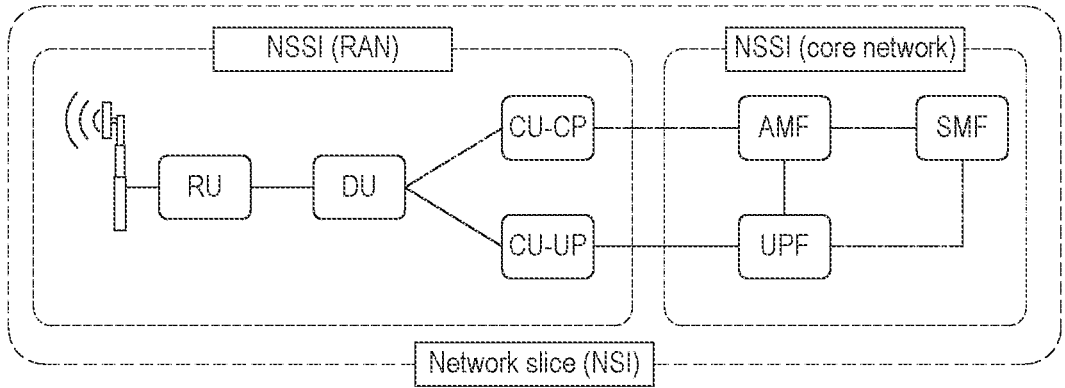
FIG. 6 an example of a network slice instance.

FIG. 6 shows an example of an NSI comprising an NSSI in the RAN with an RU, a DU, A CU-CP and a CU-UP, and an NSSI in the core network with an AMF, an SMF and a UPF.

Figure 7:
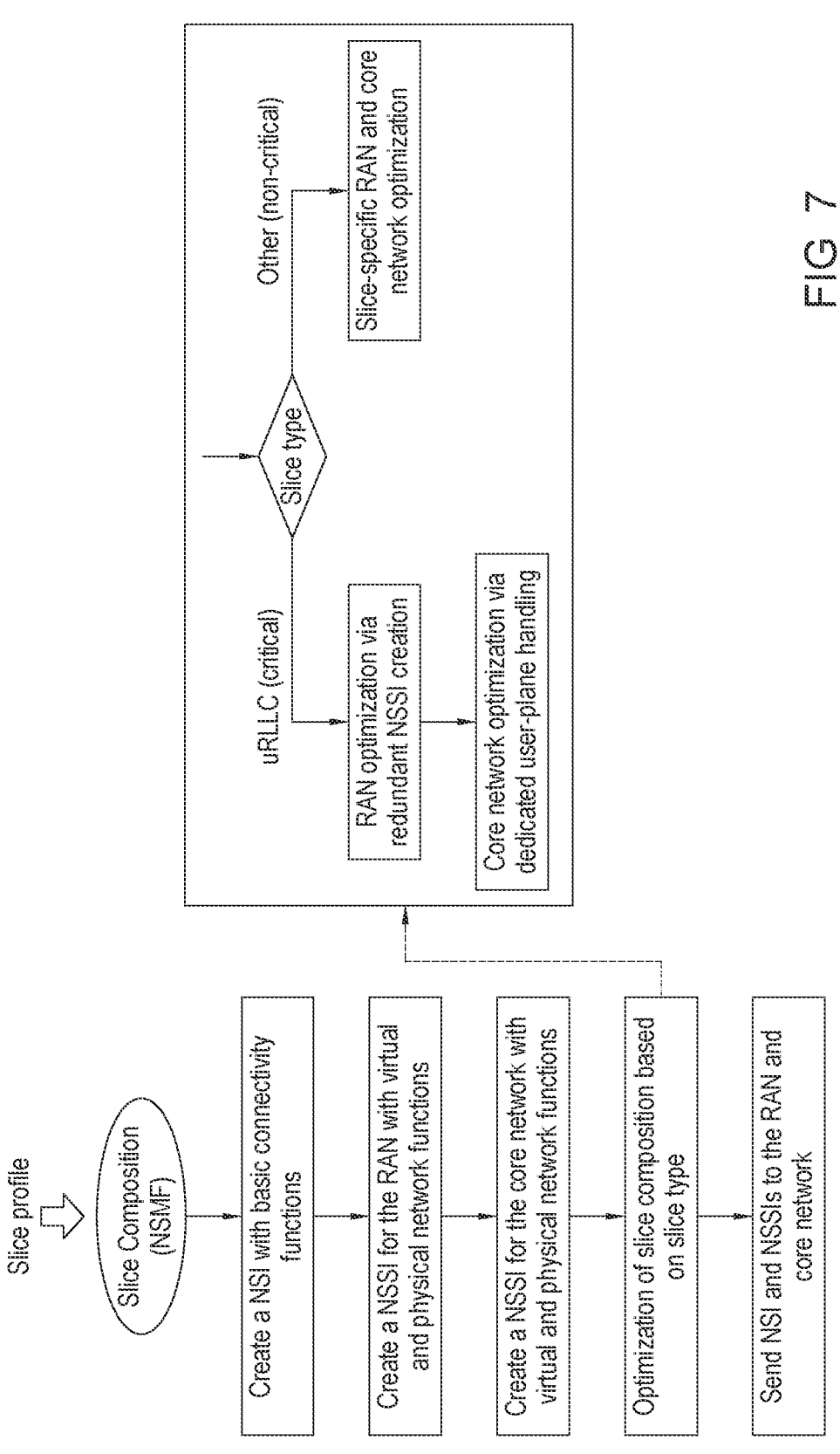
FIG. 7 shows steps for generating and distributing a network slice instance.

FIG. 7 shows an example of steps for generating and distributing an NSI in some embodiments. These steps may be performed by the NSMF of open-RAN systems such as the NSMF of the systems described above with reference to FIGS. 2 to 5.

Determining the NSI may comprise creating an NSI slice composition with basic connectivity functions which are distributed across the network. These connectivity functions may include a transmission function, connection function, forwarding function, mobility function, and security function. After the NSI is determined, the at least one NSSI in the RAN and the at least one NSSI in the core network may be created using physical and virtual functions. The nature of the network functions may depend upon the capabilities of the system. The physical and virtual functions may include the RU function, the DU function, and the CU function in the RAN, and several functions in the core network, including the AMF, the SMF, and the UPF. In some embodiments, the RU functions may by physical network functions (PNFs) and the DU, CU, AMF, SMF, and UPF network functions may be virtualized network functions (VNFs) which may be deployed in response to the determined NSSIs.

Determining the NSI may comprise performing optimization of slice composition. The optimization may be based on the slice type. For example, Ultra Reliable and Low Latency Communications (uRLLC) slices, which handle critical traffic and require strict latency and reliability performance guarantees, may be optimized differently to other non-critical slices.

Optimizing a slice composition in the RAN, such as the slice composition of a more critical slice as described above, may comprise creating a redundant NSSI in the RAN. The NSI may then comprise one NSSI for the original protocol data unit (PDU) session and another NSSI for a redundant PDU session. The redundant NSSI may have its own UPF and/or CU_CP instance and other network function instances may be common to both slices. The redundant NSSI can be dynamically deployed by the near-RT RIC and the slice instantiation function in the core network. Optimizing a slice composition in the core network, such as the slice composition of a more critical slice as described above, may be performed through a dedicated UPF for that slice. In the example embodiment shown in FIG. 7, both such techniques are performed to optimise critical uRLLC slices.

Figure 8:
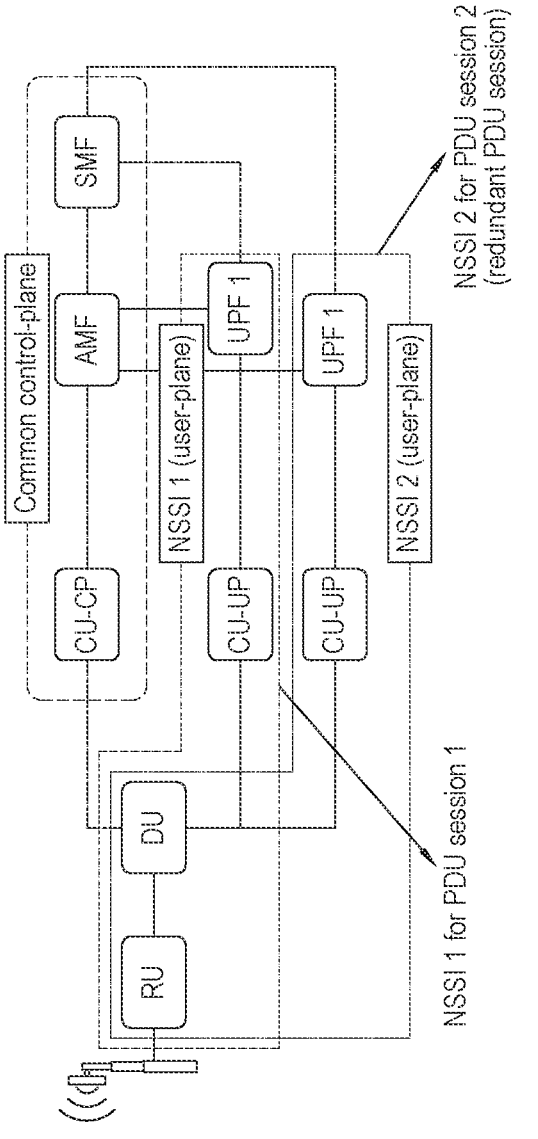
FIG. 8 shows an example of a network slice instance comprising a redundant network slice subnet instance.

FIG. 8 shows an example of a NSI for an uRLLC slice comprising a redundant NSSI. The first NSSI for the original PDU session comprises an RU, a DU, a first CU-UP, and a first UPF. The second NSSI for the redundant PDU session comprises the same RU, the same DU, a second CU-UP and a second UPF. A CU-CP, AMF and SMF are common to both slices, defining a common control plane. The redundant NSSI can be dynamically deployed by the near-RT RIC and the slice instantiation function in the core network.

After the NSI and NSSIs thereof are determined, and the at least one NSSI in the RAN is communicated to the near-RT RIC, the near-RT RIC may instantiate the at least one NSSI in the RAN.

Instantiating an NSSI in the RAN may comprise deploying VNF instances of functions for the NSSI, which may include CU instances (and/or CU-CP instances and CU-UP instances thereof), DU instances and/or RU instances, may comprise pairing CU-CP instances to CU-UP instances, may comprise mapping CU-CP instances and CU-UP instances to core network functions, may comprise pairing DU instances to RUs, and/or may comprise performing a cell setup procedure.

Figure 9:
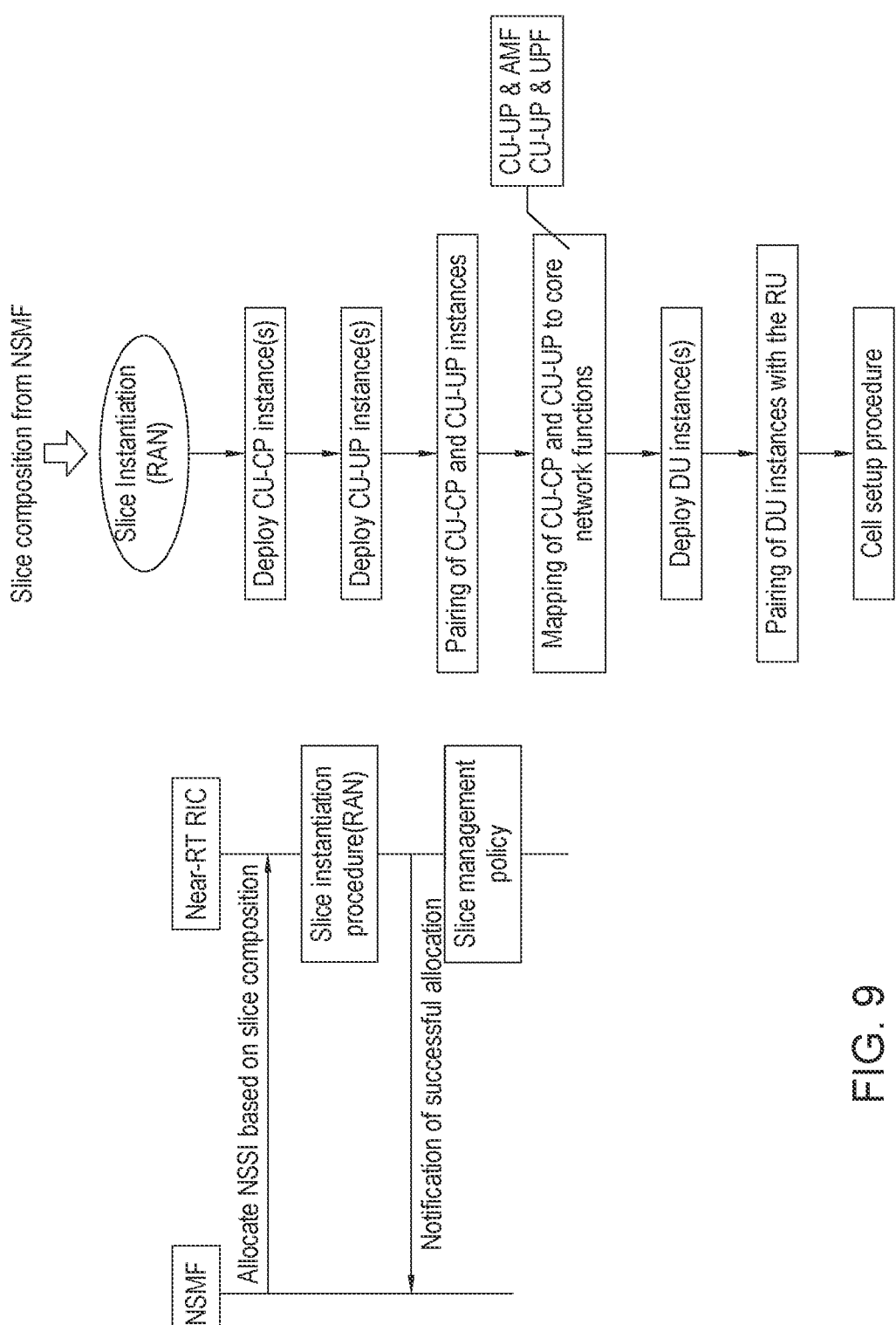
FIG. 9 shows an example of the instantiation of an NSSI in the RAN by the near-RT RIC.

FIG. 9 shows an example of the instantiation of an NSSI in the RAN by the near-RT RIC. The NSMF sends an instruction to the near-RT RIC to allocate the at least one NSSI in the RAN based on the NSI that it has determined. The slice instantiation procedure comprises, deploying one or more control-plane instance of a CU (CU-CPs) followed by deploying one or more user-plane CU instances (CU-UPs), and then pairing CU-CP and CU-UP instances in the RAN. A single CU-CP may be paired with multiple CU-UPs to share a common control-plane with multiple slice-specific user-planes in the RAN. Alternatively, a slice can have a dedicated control-plane and user-plane through dedicated CU-CP and CU-UP pairing. The number of CU-CP and CU-UP instances that are deployed depends upon the slice composition. Following their deployment, the CU-CPs and the CU-UPs are mapped to core network functions. A CU-CP is paired with an AMF while a CU-UP is paired with a UPF in the core network. After the CU-CPs and CU-UPs are deployed and mapped to core network functions, the near-RT RIC deploys one or more DU instances. The one or more deployed DU instances are paired with RUs which are physical network functions. After all the network functions have been instantiated, a cell setup procedure is activated. Once the slice instantiation is complete and successful, the near-RT RIC sends a notification message to the NSMF. Following the instantiation of the at least one NSSI in the RAN, the near-RT RIC may perform a slice management policy as described herein with reference to FIGS. 13 and 14.

After the NSI and NSSIs thereof are determined, and the at least one NSSI in the core network is communicated to the core network, a slice instantiation function of the core network may instantiate the at least one NSSI therein.

Instantiating an NSSI in the core network may comprise selecting network functions, such as selecting an SMF and/or UPF, may comprise deploying virtual network functions for the NSSI, which may include one or more AMF instances, SMF instances and UPF instances, may comprise mapping UPF instances to AMF and SMF instances, and may comprise configuring deployed instances, for example, with slice-specific information including data network name (DNN) allocation.

Figure 10:
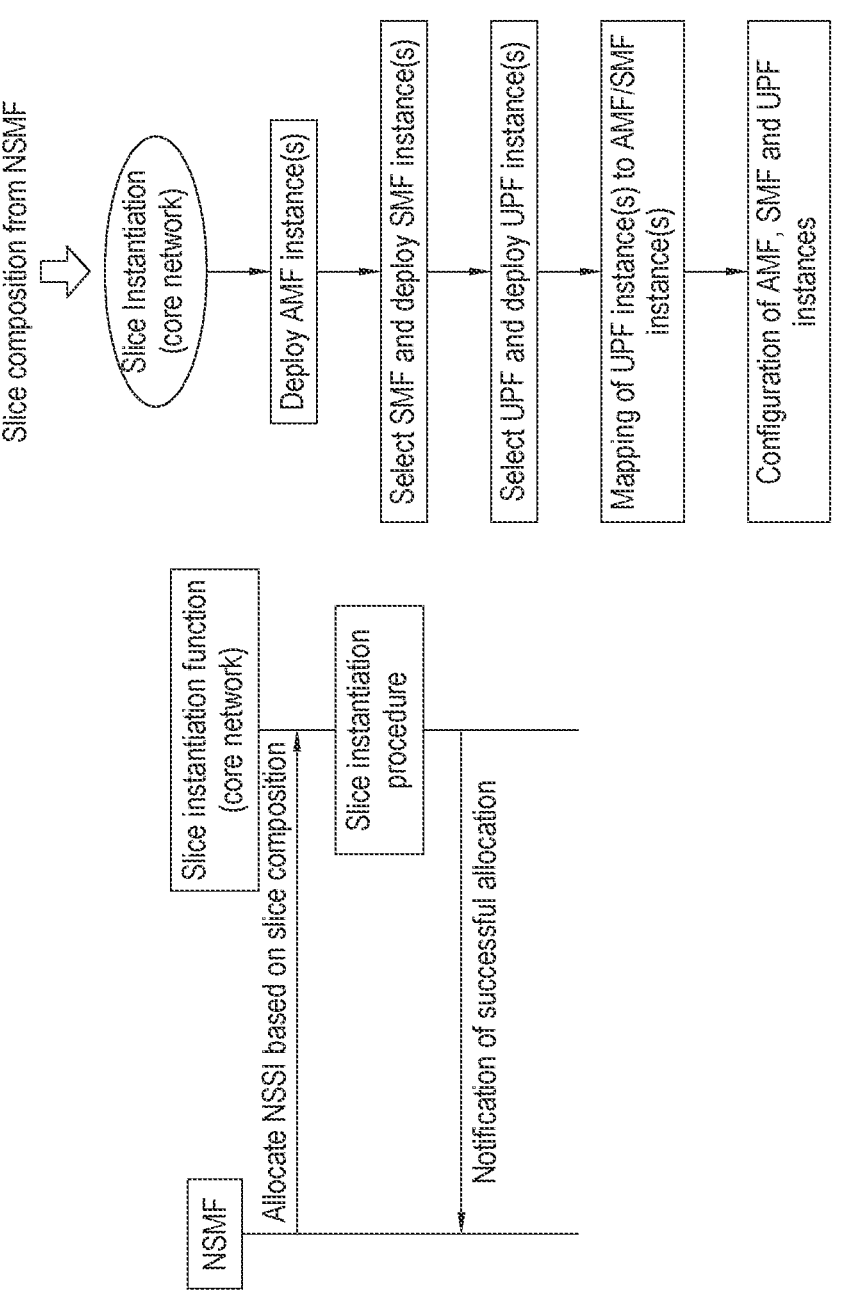
FIG. 10 shows an example of the instantiation of an NSSI in the core network by a slice instantiation function thereof.

FIG. 10 shows an example of the instantiation of an NSSI in the core network by a slice instantiation function thereof. The NSMF sends a message to the slice instantiation function in the core network to allocate the at least one NSSI according to the determined slice composition. The slice instantiation starts with deployment of one or more AMF instances. This is followed by SMF selection and deployment of one or more SMF instances. Next, the slice instantiation function performs UPF selection and deploys one or more UPF instances. The slice instantiation function then performs a mapping of UPF instances to AMF and SMF instances. This is followed by configuration of deployed instances with slice-specific information including data network name (DNN) allocation. Once slice instantiation is complete and successful, the slice instantiation function sends a notification message to the NSMF.

Figure 11:
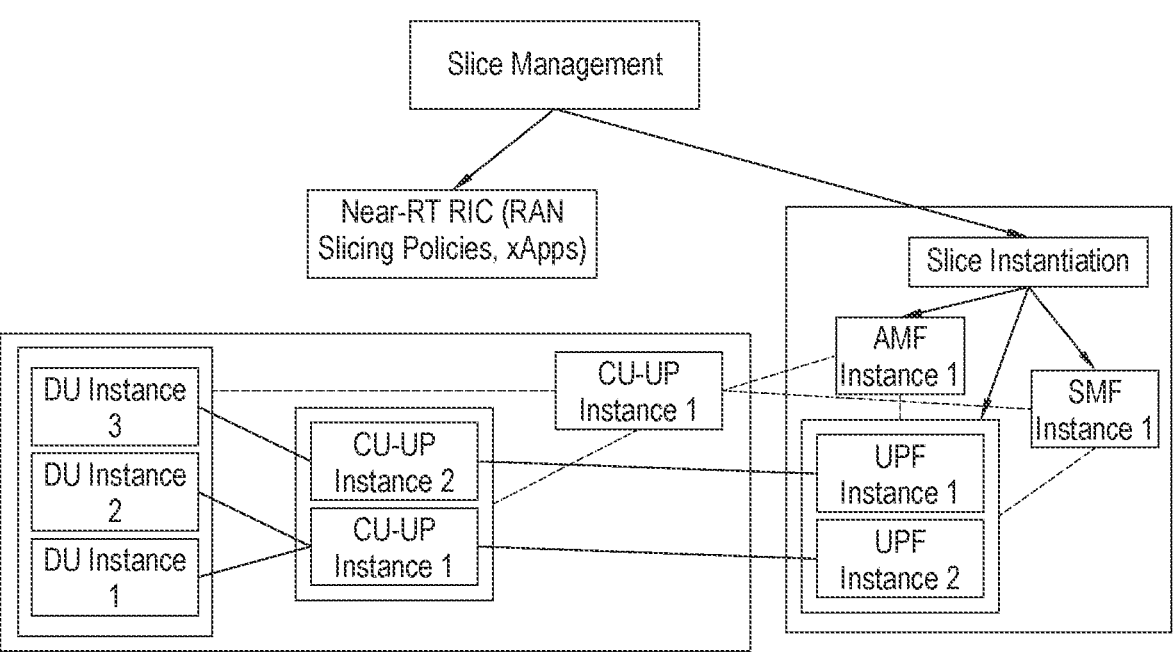
FIG. 11 shows an NSI comprising a RAN NSSI and a core network NSSI.

FIG. 11 shows an example of an NSI comprising a RAN NSSI and a core network NSSI created using methods as described above. The NSSIs comprise instance of a DU, CU-CP, CU-UP, AMF, UPF and SMF. No RU's are shown as these may be provided as PNFs instead of VNF instances. An instance is a virtual network function handling user-plane or control-plane traffic. FIG. 11 also shows the slice management functions (the CSRF and the NSMF) communicating with the slice instantiation function of the core network (for example via a REST API) and with the near-RT RIC (for example via the A1 interface) and the near-RT RIC communicating with the instances of the RAN NSSI.

Figure 12:
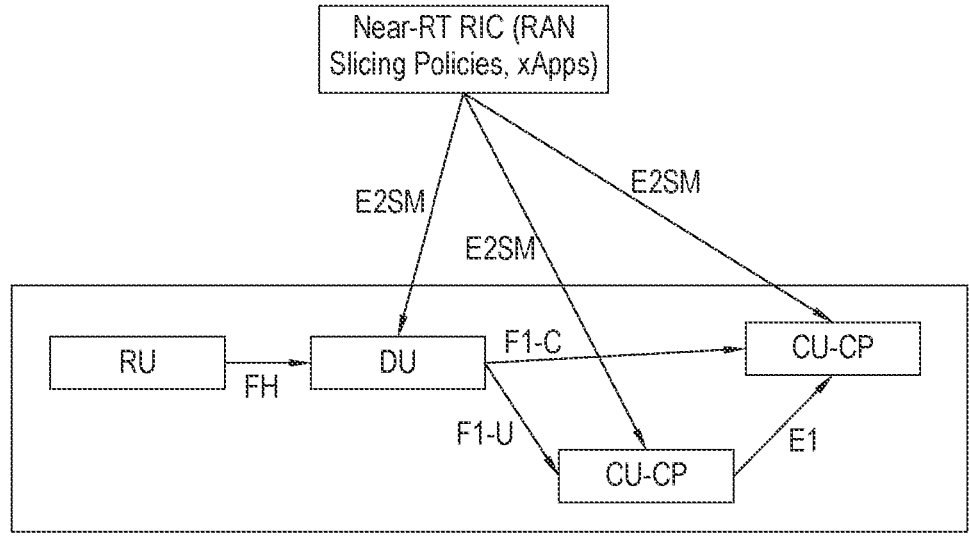
FIG. 12 shows the standard 3GPP and open RAN interfaces between the near-RT RIC and the various E2 nodes of the RAN

FIG. 12 shows the standard 3GPP and open RAN interfaces between the near-RT RIC and the various E2 nodes of the RAN (the CU and DU instances). The near-RT RIC uses E2 service model (E2SM) messages to configure the E2 nodes for monitoring and defining new policies.

After an NSSI is instantiated in an RAN by a near-RT RIC, for example in a method as described above, an embodiment of a method for managing the network slice may be performed by the near-RT RIC. The slice management method may dictate run-time monitoring, creation, deletion, and modification of slice instances in the RAN.

Embodiments of methods for managing a network slice in a RAN described herein comprise a near-RT RIC: receiving periodic reports from a plurality of virtual network function instances in the RAN, the reports including a plurality of parameters of the instance; comparing at least one of the received parameters to at least one criteria; and if the at least one received parameter meets the at least one criteria, modifying or deleting that instance. Advantageously embodiments allow slicing in an Open RAN system by exploiting the capabilities of the O-RAN architecture.

The plurality of VNF instances may be E2 nodes (i.e. DUs, CU-CPs, and/or CU-UPs that communicates with the near RT-RIC via an E2 interface). Such nodes may be configured to provide periodic reports, may be modified, and/or may be deleted via the E2 interface and/or using E2 service model (E2SM) instructions.

In some embodiments, the method comprises the near-RT RIC configuring the plurality of VNF instances. The near-RT RIC may configure the plurality of VNF instances to provide the reports by transmitting an instruction to the plurality of VNF instance to provide such periodic reports, such as an E2SM RIC subscription request. The instruction may specify a reporting period, a granularity period, the parameters to be reported by the instance, and/or labels for the parameters. The E2SM RIC subscription request may have its RIC Action Type set to Report and its RIC Action Definition set to Measurement Name and Measurement Label. Upon receiving the instruction, the VNF instances may periodically transmit reports to the near-RT RIC, such as E2SM RIC Indication messages. The E2SM measurement labels may be associated with the measurement type, such as slice ID, or 5G QoS Indicator (5QI).

Figure 13:
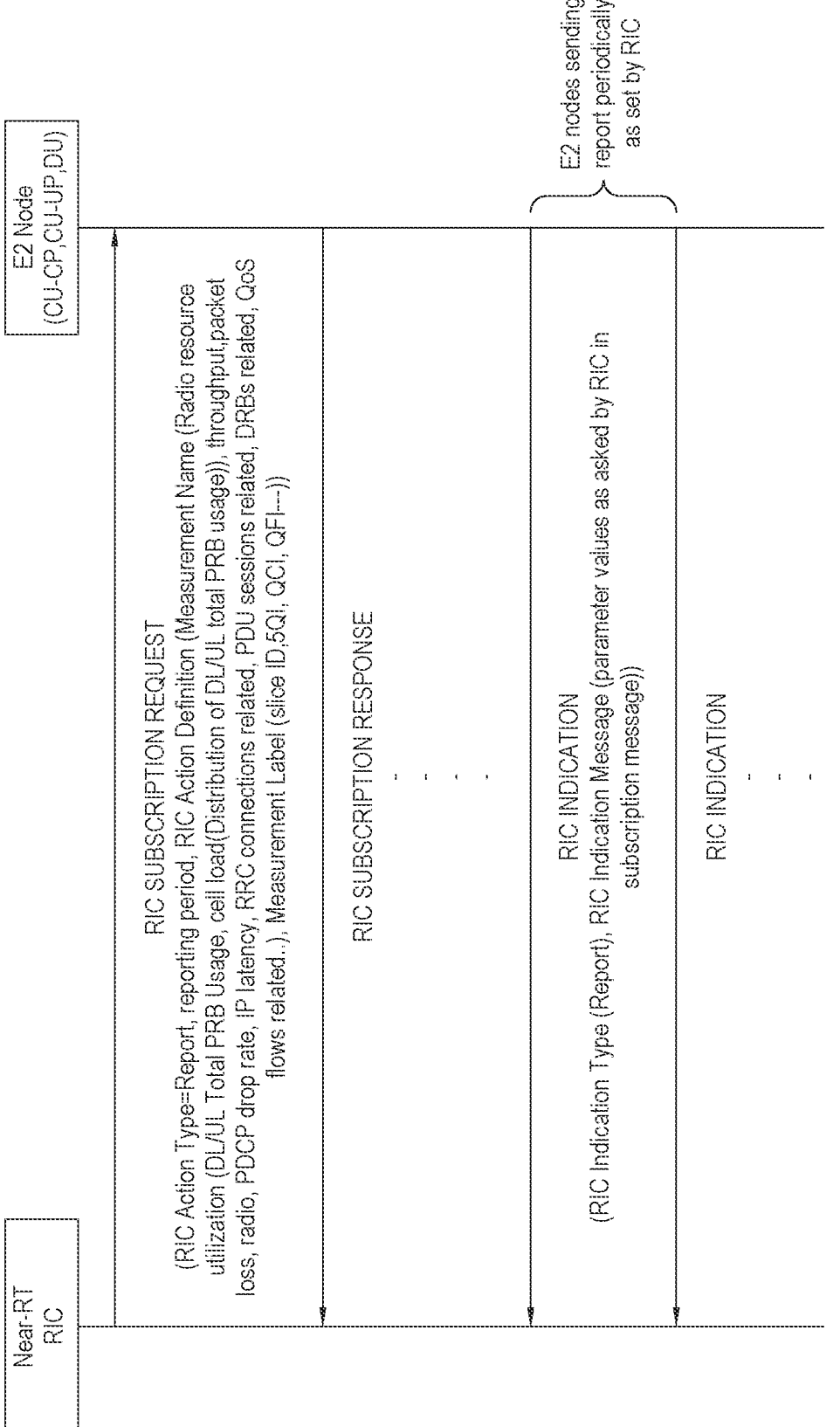
FIG. 13 shows an example of a near-RT RIC configuring an E2 node VNF instance to transmit periodic RIC Indication message reports.

FIG. 13 shows an example of a near-RT RIC configuring an E2 node VNF instance (a CU-CP, CU-UP, or DU) to transmit periodic RIC Indication message reports using an RIC Subscription Request instruction.

The parameters included in the periodic report transmitted by each VNF instance may be or may comprise parameters specific to that VNF instance, such as CPU utilization and/or memory usage of that instance. Alternatively, or additionally, the parameters may be or may comprise parameters specific to the network slice, or to the network slice and a specific quality of service (QoS) flow. The parameters may be key performance indicators (KPIs). The parameters may include: downlink/uplink throughput, downlink/uplink block error rate (BLER); and/or other parameters as shown in FIG. 13.

The near-RT RIC compares at least one of the received parameters (and/or other parameters derived therefrom) to at least one criteria.

In some embodiments, the near-RT RIC may compare parameters to a plurality of different criteria. In such embodiments, the near-RT RIC may compare different parameters or combinations thereof to different criteria, and may differently modify or delete the instance in response to such parameters meeting such different criteria. The criteria that are compared to at least one parameter may include a deletion criteria, and/or a modification criteria.

In addition to comparing the received parameters to criteria, the near-RT RIC may evaluate other criteria, such as a slice expiration criteria and/or an instance not-responding criteria. If a duration of the network slice meets or exceeds a threshold duration, the slice duration criteria may be met and the near-RT RIC may delete all instances in the network slice. If an individual VNF instance is unresponsive, for example, if it does not provide periodic reports, the near-RT RIC may delete that VNF instance and may create a new VNF instance to replace it.

The deletion criteria may be met if a parameter (or a number of parameters or specific combination of parameters) indicating utilization of the VNF instance fall below a threshold level. If the deletion criteria, that VNF instance may be deleted by the near-RT RIC. Parameters indicating utilization may comprise downlink/uplink total physical resource block (PRB) usage, mean downlink/uplink PRB used for data traffic, and/or other parameters. Instances may become underutilized due to data rate changes, a number of connections dropping, or service level agreement (SLA) changes.

Slice modification may become necessary, for example, when slice resources are underutilised, a need to include more devices in a slice and changes to QoS requirements. The modification criteria may be met if any of a selected parameter (or a number of parameters or specific combination of parameters) meet a given threshold or range. The modification criteria may be met in the event of link quality deterioration, protocol data unit (PDU) session modification or stopping, a change in downlink/uplink data rate requirements, and/or a change in the SLA for the slice.

If VNF instances are replaced or modified in response to modification criteria or instance not-responding criteria being met, the modified or replacement VNF instances may be configured by the near-RT RIC to provide periodic reports as described above.

Figure 14:
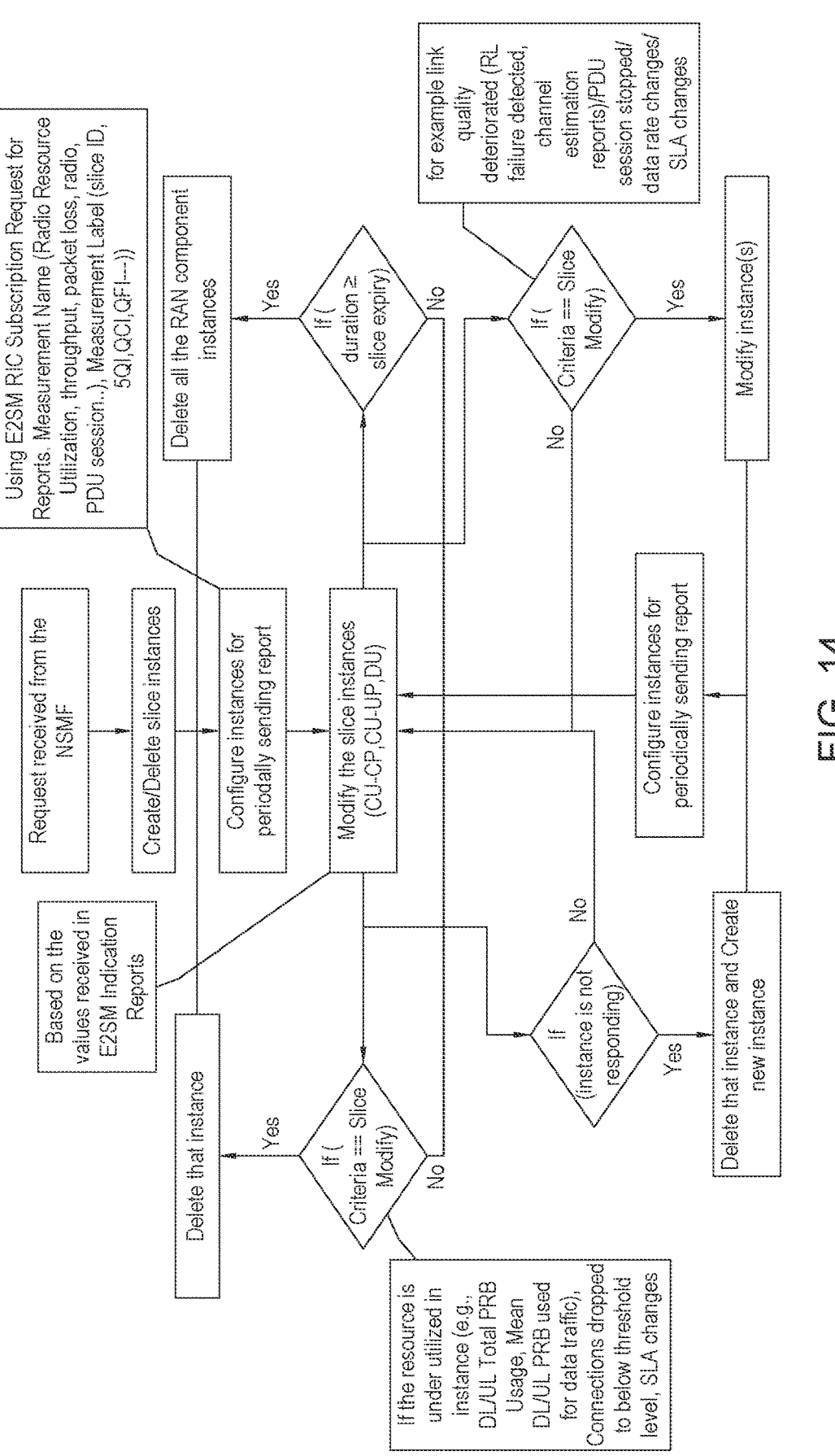
FIG. 14 shows an example of a method of monitoring a network slice in a RAN.

FIG. 14 shows an example of a method of monitoring a network slice in a RAN involving deletion, modification, slice duration and instance not-responding criteria.

In some embodiments, the method may comprise dynamically activating and/or deactivating VNF instances. For example, in the case of duplicating packets for critical traffic, an additional CU-UP instance may be deployed. Packets can also be duplicated for control-plane traffic. For example, in the case of improving robustness for mobility management, an additional CU-CP may be deployed. Activation of additional CU-UPs by the near-RT RIC can be triggered by the CU-CP if it receives a request from the SMF.

In some embodiments, the method comprises dynamically adjusting the allocated radio resources for a DU instance. This may be achieved through slicing policies defined in 5G-SliceR or NetSliceR.

In some embodiments, the method may be performed by an RIC platform which simultaneously operates as a near-RT RIC and a non-RT RIC.

Embodiments described herein provide disaggregated network slice management, with a logical and physical split of slice arrangement functions in comparison to conventional integrated slicing controllers, thereby providing flexibility for open RAN deployments. may provide real-time and non-real-time automated management and orchestration of network slices, may dynamically manage network slices in terms of allocated resources using a RIC-centric policy, and may enable neutral host deployments where multi-mobile-network-operator slices with strict service level agreements are required.

While certain arrangements have been described, they have been presented by way of example only, and are not intended to limit the scope of protection. The inventive concepts described herein may be implemented in a variety of other arrangements. In addition, various additions, omissions, substitutions and changes may be made to the arrangements described herein without departing from the scope of the invention as defined by the following claims.

The invention claimed is:

1. A method for creating a network slice in a communication network, the method comprising:

determining a network slice instance (NSI), the communication network comprising a radio access network (RAN), a core network, and a RAN Intelligent Controller (RIC), with a near-real-time RIC (near-RT RIC), a slice profile being translated into the NSI for both the RAN and the core network, the slice profile being created based on high-level slice requirements, the near-RT RIC controlling real-time elements of the RAN;

creating at least one network slice subnet instance, NSSI, in the RAN including physical network functions, the physical network functions being defined by components of the RAN, the slice profile being translated into the NSSI for both the RAN and the core network;

creating at least one NSSI in the core network including virtual network functions, the virtual network functions being defined by components of the core network, the NSI comprising at least one NSSI in the RAN and at least one NSSI in the core network;

communicating the at least one NSSI in the RAN to the near-RT RIC, wherein after the near-RT RIC receives the at least one created NSSI, the near-RT RIC triggers deployment of the at least one NSSI in the real-time elements of the RAN; and communicating the at least one NSSI in the core network to the core network, wherein after the core network receives the at least one created NSSI, the core network triggers deployment of the at least one NSSI in the core network.

2. The method according to claim 1, wherein the NSI is determined based on at least one slice requirement which includes at least one of a slice type, an end-to-end latency for the slice, an average downlink or uplink throughput, an end-to-end latency variation, a reliability, a number of required connections, an associated quality-of-service profile, or a resource type.

3. The method according to claim 2, comprising receiving customer requirements for the network slice and converting the customer requirements into the at least one slice requirement.

4. The method according to claim 1 wherein the NSI is determined by a 5G service platform comprising a non-real-time RIC.

5. The method according to claim 1 further comprising the near-RT RIC deploying the at least one NSSI in the RAN and a slice instantiation function of the core network deploying the at least one NSSI in the core network.

6. The method according to claim 1 wherein determining the NSI comprises creating an NSI slice composition with basic connectivity functions which are distributed across the network, the connectivity functions comprising a transmission function, a connection function, a forwarding function, a mobility function, and a security function.

7. The method according to claim 1 wherein determining the NSI comprises performing optimization of the NSI by creating a redundant NSSI in the RAN.

8. The method according to claim 1 further comprising the near-RT RIC:

deploying at least one control plane centralised unit (CU-CP) virtual network function (VNF) instance;

deploying at least one user plane centralised unit (CU-UP) VNF instance;

pairing each of CU-CP VNF instances with one or more CU-UP VNF instances;

mapping the CU-UP VNF instances and the CU-CP VNF instances to core network functions;

deploying at least one distributed unit, DU, VNF instance; and pairing the at least one DU VNF instance with a radio unit, RU, physical network function, PNF.

9. The method according to claim 1 further comprising the core network:

deploying at least one access and mobility management function (AMF) virtual network function (VNF) instance;

selecting a session management function (SMF);

deploying at least one SMF VNF instance;

selecting a user plane function (UPE);

deploying at least one UPF VNF instance; and mapping the at least one UPF VNF instance to the at least one AMF VNF instance and to the at least one SMF VNF instance.

10. The method for a near-RT RIC to manage the network slice created by a method according to claim 1 in a RAN, the method comprising the near-RT RIC:

receiving periodic reports from a plurality of virtual network function instances in the RAN, the reports including a plurality of parameters of the instance;

comparing at least one of the received parameters to at least one criteria; and if the at least one received parameter meets the at least one criteria, and modifying or deleting that instance.

11. One or more non-transitory storage media comprising computer instructions executable by a processor, the computer instructions when executed by the processor causing the processor to perform the method according to claim 1.

\*    \*    \*    \*    \*